(12) United States Patent
Hestrin

(10) Patent No.: US 9,653,860 B2
(45) Date of Patent: May 16, 2017

(54) ULTRABOX RECEPTACLE BOX

(71) Applicant: Mark Hestrin, Encino, CA (US)

(72) Inventor: Mark Hestrin, Encino, CA (US)

( * ) Notice: Subject to any disclaimer, the term of this patent is extended or adjusted under 35 U.S.C. 154(b) by 0 days.

(21) Appl. No.: 14/835,047

(22) Filed: Aug. 25, 2015

(65) Prior Publication Data
US 2016/0329668 A1 Nov. 10, 2016

Related U.S. Application Data

(60) Provisional application No. 62/157,888, filed on May 6, 2015.

(51) Int. Cl.
| | |
|---|---|
| H01R 13/60 | (2006.01) |
| H01R 25/00 | (2006.01) |
| H01R 13/514 | (2006.01) |
| H01R 24/76 | (2011.01) |
| H01R 25/16 | (2006.01) |
| H01R 13/73 | (2006.01) |
| H01H 9/02 | (2006.01) |
| H01R 24/28 | (2011.01) |
| H01R 4/24 | (2006.01) |
| H02G 3/16 | (2006.01) |
| H01R 107/00 | (2006.01) |

(52) U.S. Cl.
CPC ............ *H01R 25/006* (2013.01); *H01H 9/02* (2013.01); *H01R 13/514* (2013.01); *H01R 13/73* (2013.01); *H01R 24/28* (2013.01); *H01R 24/76* (2013.01); *H01R 25/164* (2013.01); *H01R 4/24* (2013.01); *H01R 2107/00* (2013.01); *H02G 3/16* (2013.01)

(58) Field of Classification Search
CPC .. H01R 25/006; H01R 24/28; H01R 2107/00; H01R 25/003; H01R 12/7088; H01H 9/02; H02G 3/128
USPC .......................................................... 439/535
See application file for complete search history.

(56) References Cited

U.S. PATENT DOCUMENTS

| | | | | |
|---|---|---|---|---|
| 4,993,970 | A * | 2/1991 | Littrell ................. | H01R 25/006 174/490 |
| 7,736,174 | B2 * | 6/2010 | Bhosale ................. | F21V 33/00 365/95 |
| 8,262,399 | B1 * | 9/2012 | Zien ...................... | H01R 25/003 439/188 |
| 8,608,490 | B2 * | 12/2013 | Keswani ............ | H01R 12/7088 439/76.1 |
| 9,130,285 | B2 * | 9/2015 | Scanzillo ............. | H01R 4/4818 |
| 2009/0163074 | A1 * | 6/2009 | Arflack .................. | H02G 3/128 439/535 |

* cited by examiner

*Primary Examiner* — Jean F Duverne
(74) *Attorney, Agent, or Firm* — Robert C. Klinger

(57) ABSTRACT

A modular electrical receptacle box configured to allow outlets and switches to be easily installed using wire segments extending between terminals in the box bottom surface and the outlet and switch. The box has a housing having a first recess, at least one electrical outlet or switch secured to the housing and disposed in the first recess, a plurality of electrical terminals disposed in the bottom wall, a plurality of electrical conductor segments extending between the outlet or switch and the electrical terminals, and a first connector coupled to the electrical terminals via a plurality of electrical busses.

14 Claims, 11 Drawing Sheets

ULTRABOX RECEPTACLE BOX

CLAIM OF PRIORITY

This application claims priority under 35 U.S.C. Section 119(e) of U.S. Provisional Patent Application Ser. No. 62/157,888 entitled ULTRABOX RECEPTACLE BOX filed May 6, 2015, the teachings of which are included herein by reference in its entirety.

FIELD OF THE DISCLOSURE

This disclosure is directed to electrical boxes used in home and business construction, including boxes for housing outlets, switches, connectors etc.

BACKGROUND OF THE DISCLOSURE

Electrical receptacle boxes are commonly used in residential and commercial construction to house outlets, switches, connectors and other interfaces for connectivity. Traditional electrical boxes are typically secured to framing supporting walls in the structure, such as by nails, and electrical wiring is routed throughout the structure to the receptacle boxes, such as Romex® wiring available from Southwire Corporation. The electrical wiring is typically electrically connected to outlets, switches and the like using wiring nuts to join stripped ends of multiple wires together, with the wires terminating on terminals having screws or into openings configured to secure to the ends of the wire.

This wiring is very cumbersome to connect, and the coiling of excess wire in a small receptacle box is difficult and frustrating. The problem is compounded in receptacle boxes with multiple gangs of switches and outlets. The multiple wires and wire nuts are often referred to as a birds nest. Servicing of existing wires and wire nuts after initial installation is extremely frustrating and problematic as well. For instance, replacing a standard switch with a dimmer switch is difficult, and may lead to unintentionally disconnecting another set of wires during the manipulation of the switch and wires.

SUMMARY

A modular electrical receptacle box configured to allow outlets and switches to be easily installed using wire segments extending between terminals in the box bottom surface and the outlet and switch. The box has a housing having a first recess, at least one electrical outlet or switch secured to the housing and disposed in the first recess, a plurality of electrical terminals disposed in the bottom wall, a plurality of electrical conductor segments extending between the outlet or switch and the electrical terminals, and a first connector coupled to the electrical terminals via a plurality of electrical busses.

DETAILED DESCRIPTION OF THE DISCLOSURE

The present disclosure provides a new receptacle box configured to simplify both the installation and replacement cycles of common electrical receptacle boxes for residential and commercial applications. The design replaces the traditional inefficient and inconvenient bunch of wires and wire nuts typically found stuffed into receptacle boxes with a modified "plug and play" style configuration.

Figure 1:
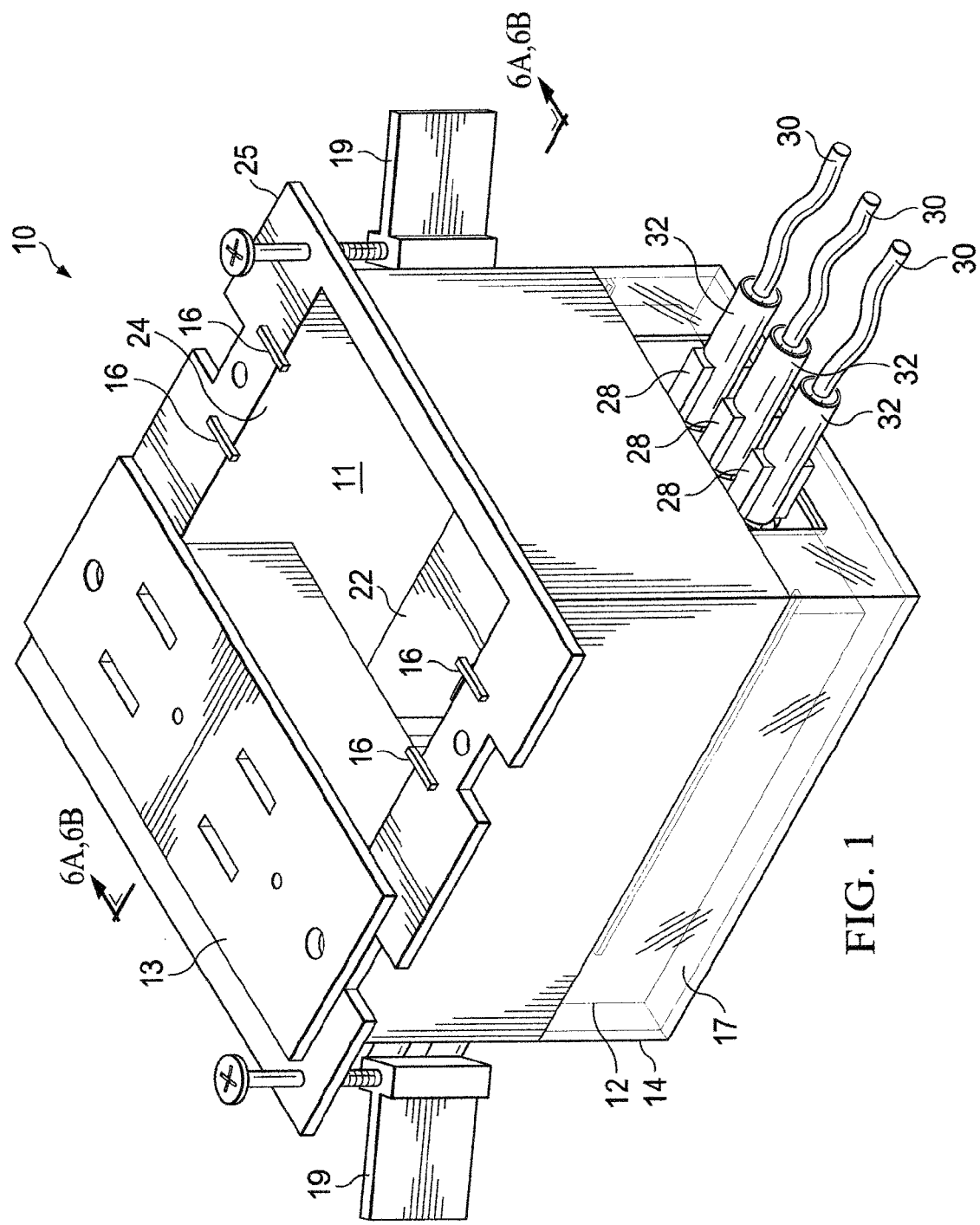
FIG. 1 is a perspective view of a modular receptacle box including an outlet joined to electrical wiring using wire segments having connectors, such as female type connectors, the wire segments electrically joining the receptacle to male type terminals of an electrical bus extending in the box.
Figure 2:
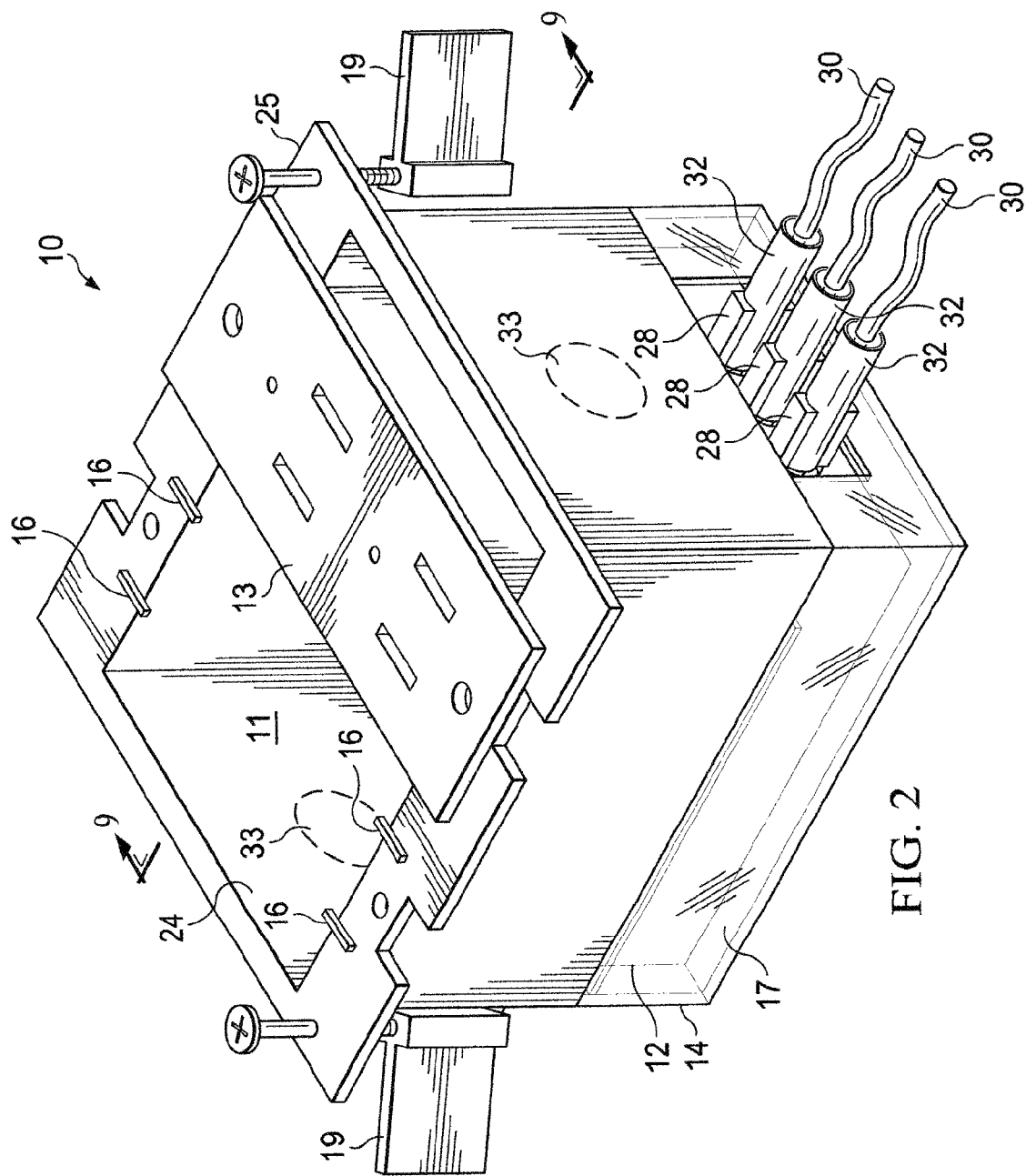
FIG. 2 is a view of the receptacle box of FIG. 1 with the outlet selectively installed in another position in the box.

Referring to FIGS. 1 and 2, a modular receptacle box 10 includes a body 12 forming a housing. Body 12 has a recess 11 configured to receive one or more electrical modules 13, such as a pair of electrical outlets configured to receive electrical plugs of as shown, as well as one or more electrical switches, connector interfaces such as cable/TV modules, and the like. An opening of the recess 11 has upwardly extending tabs 16 configured to receive mating portions of ends of the electrical modules 13 to align the respective electrical modules 13 in parallel in the recess 11. The body 12 is configured to securely mount a switch or outlet module 13 in precisely the correct orientation such that the switches/outlets residing in the receptacle box 10 will fit properly (flush) the first time, every time, thus allowing the receptacle box cover plate to also fit flush, the first time, every time.

The receptacle box 10 has a removable cover 14 configured to snap over an indented rear portion 15 of body 12 and forms a cavity 17 in the back of the receptacle box 10 to protect and cover electrical busses as will be described. In one preferred embodiment, a pivotable tab or finger 19 is configured to secure the receptacle box 10 to a support member, such as a wall stud, by pinching the support member between a flange 25 of the housing and the tab 19 upon tightening a respective member, shown as a screw.

The receptacle box includes a connector on each end of the receptacle box formed by a plurality of terminals 26 extending from electrical busses. The connectors are opposing, and are configured to selectively connect to a 3-strand new construction wiring, such as Romex wiring, via insulated wire connectors 32. Each connector 32 has a pair of opposing spring members 28 configured to be pinched by a user's fingers to grasp the connector 32 when connected and disconnected from the receptacle box connector. The connectors allow multiple receptacle boxes 10 to be connected in series, such as in a daisy chain configuration.

Figure 3:
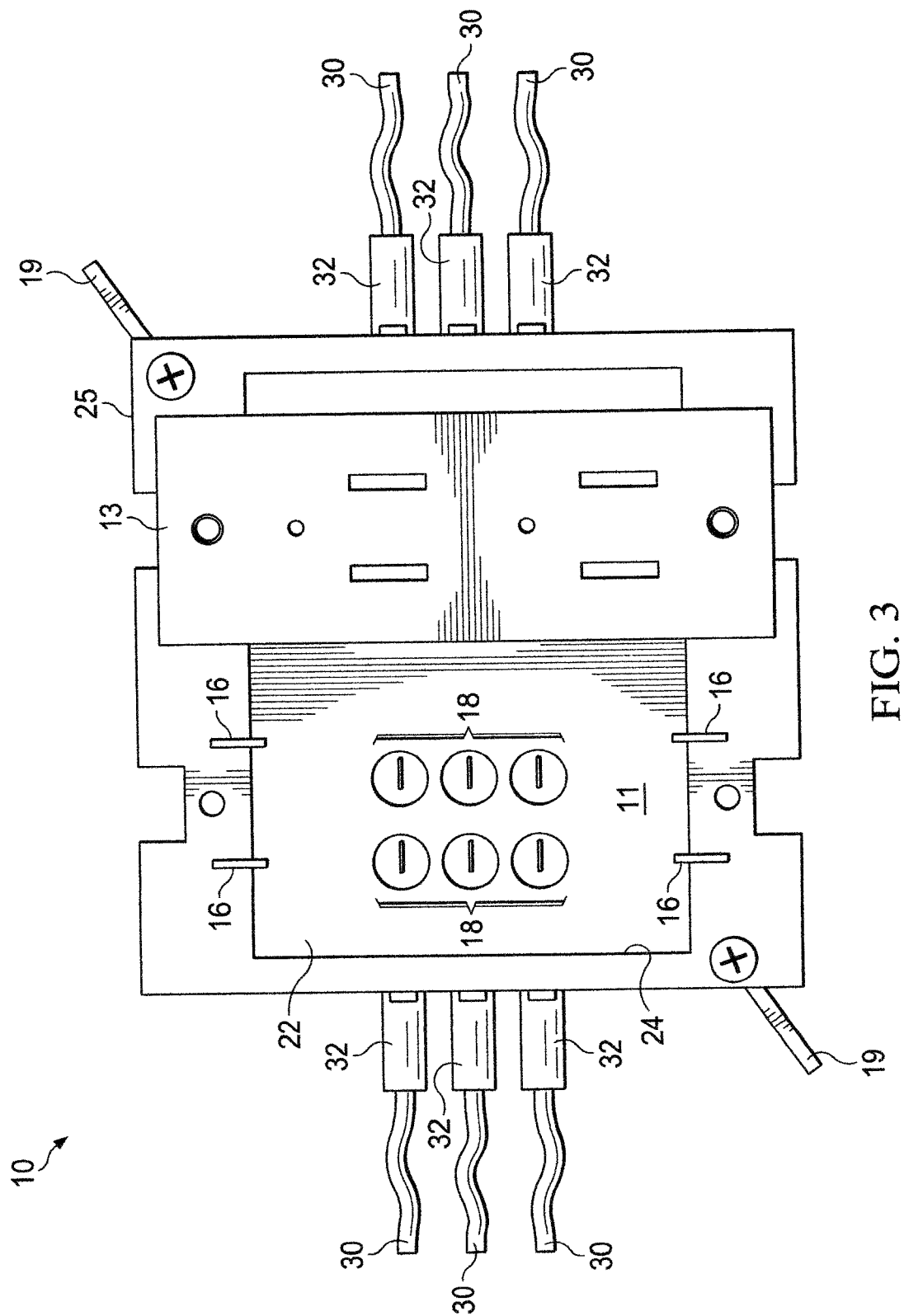
FIG. 3 is a top view of the receptacle box in FIG. 2 illustrating the male terminals of the electrical bus extending through openings in the bottom wall of the box, wherein an end set male terminals may be connected to hot, such as standard 110V AC, the middle set of male terminals may be connected to neutral, and the other end set of male terminals may be connected to ground.
Figure 5:
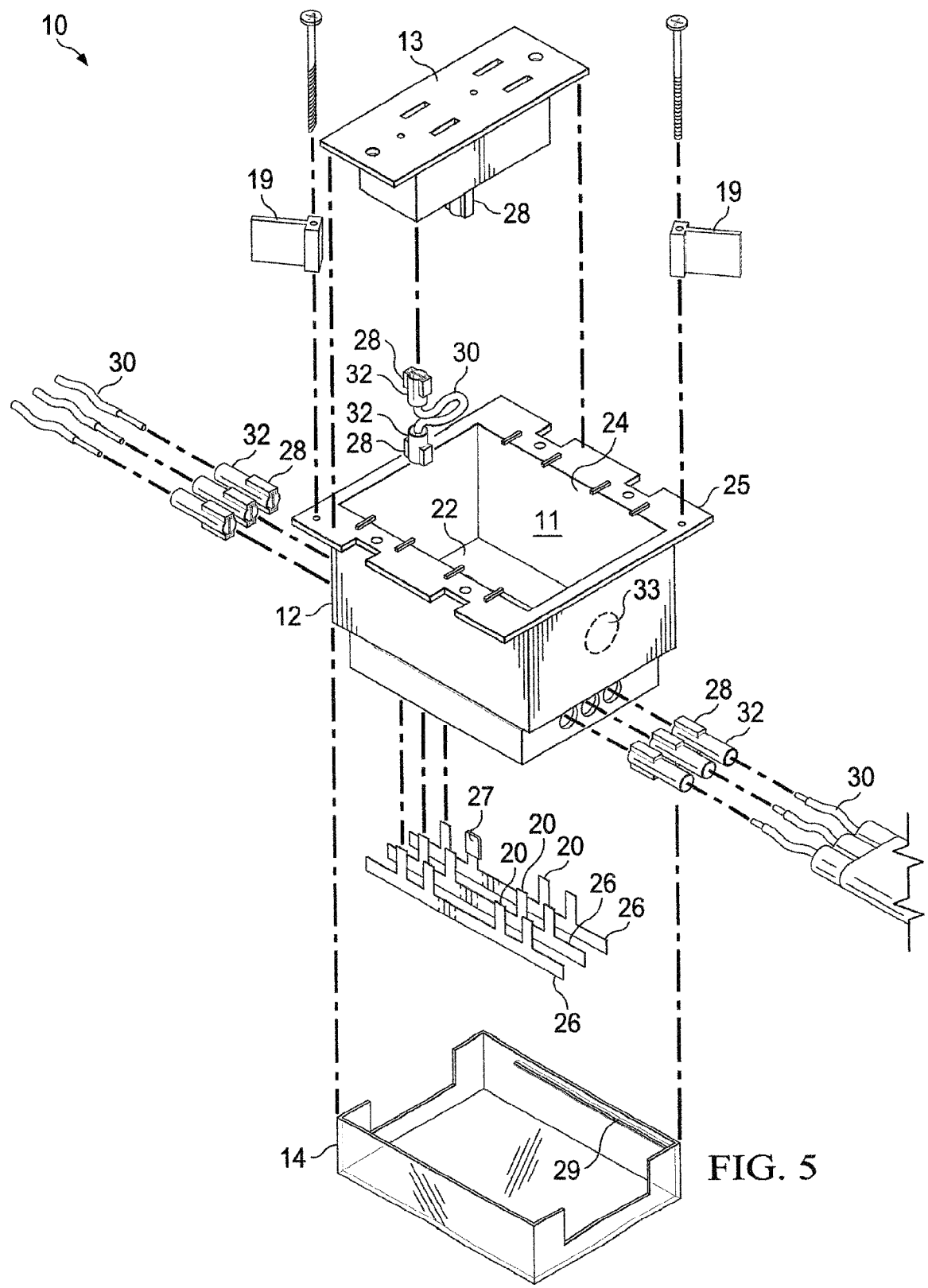
FIG. 5 is an exploded view of the receptacle box of FIG. 1, illustrating the male terminals of the electrical bus for connectivity to the wire segments in the receptacle box, and also for connectivity to electrical wiring servicing the receptacle box.

FIG. 3 illustrates a top view of the receptacle box 10. The housing 12 has a bottom wall 22 and a plurality of side walls 24 defining the recess 11. The bottom wall 22 has a plurality of formed or drilled openings 18 configured to allow male tabs 20 of the electrical busses to extend into the recess 11, as shown in FIG. 5. There is a set of openings 18 provided for each electrical module 13, shown as six (6) openings, the openings 18 being positioned under the respective electrical module 13.

Figure 4:
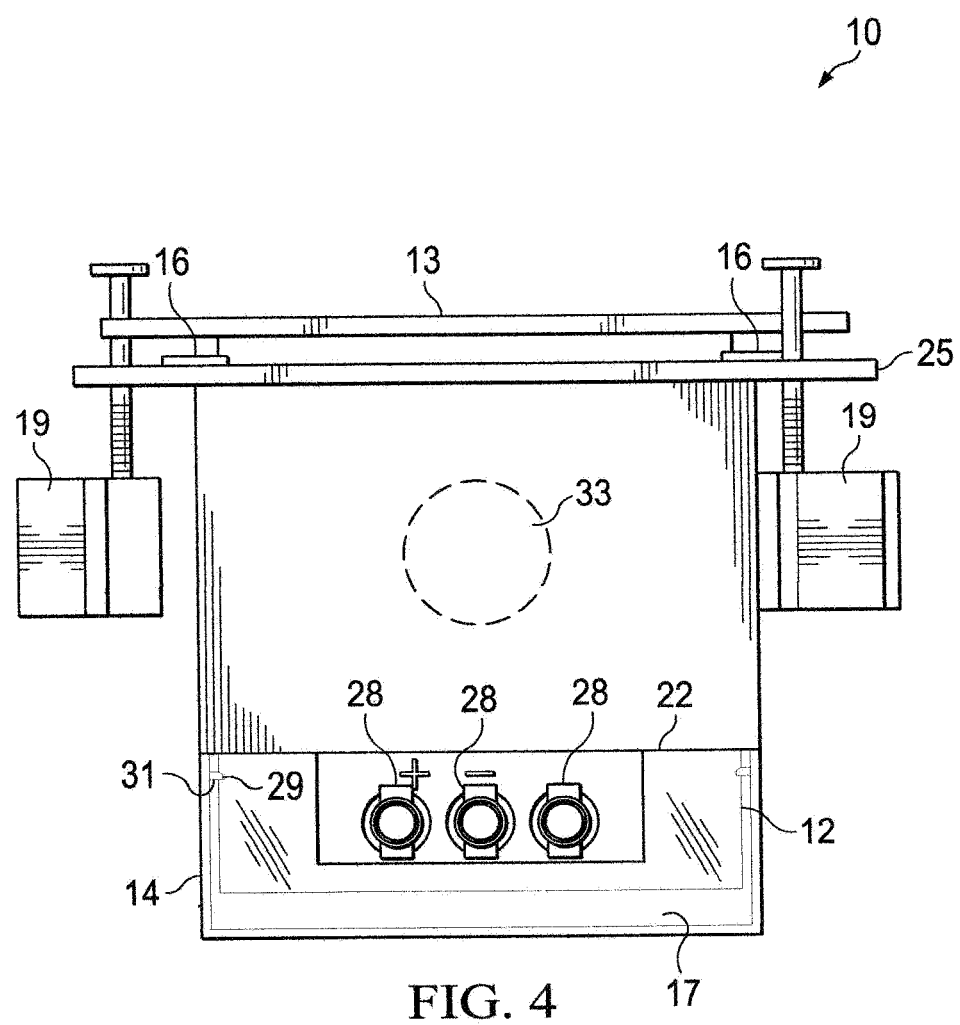
FIG. 4 is an end view of the receptacle box.

FIG. 4 is an end view of the receptacle box 10 illustrating the connectors 32 and the assigned voltage of the terminals of the receptacle box. For example, the left terminal may be for hot, such as 110 VAC, the middle terminal for neutral, and the right terminal for ground. In another embodiment, the left terminal may be for a positive voltage, the middle terminal for negative, and the right terminal being unused.

Figure 6A:
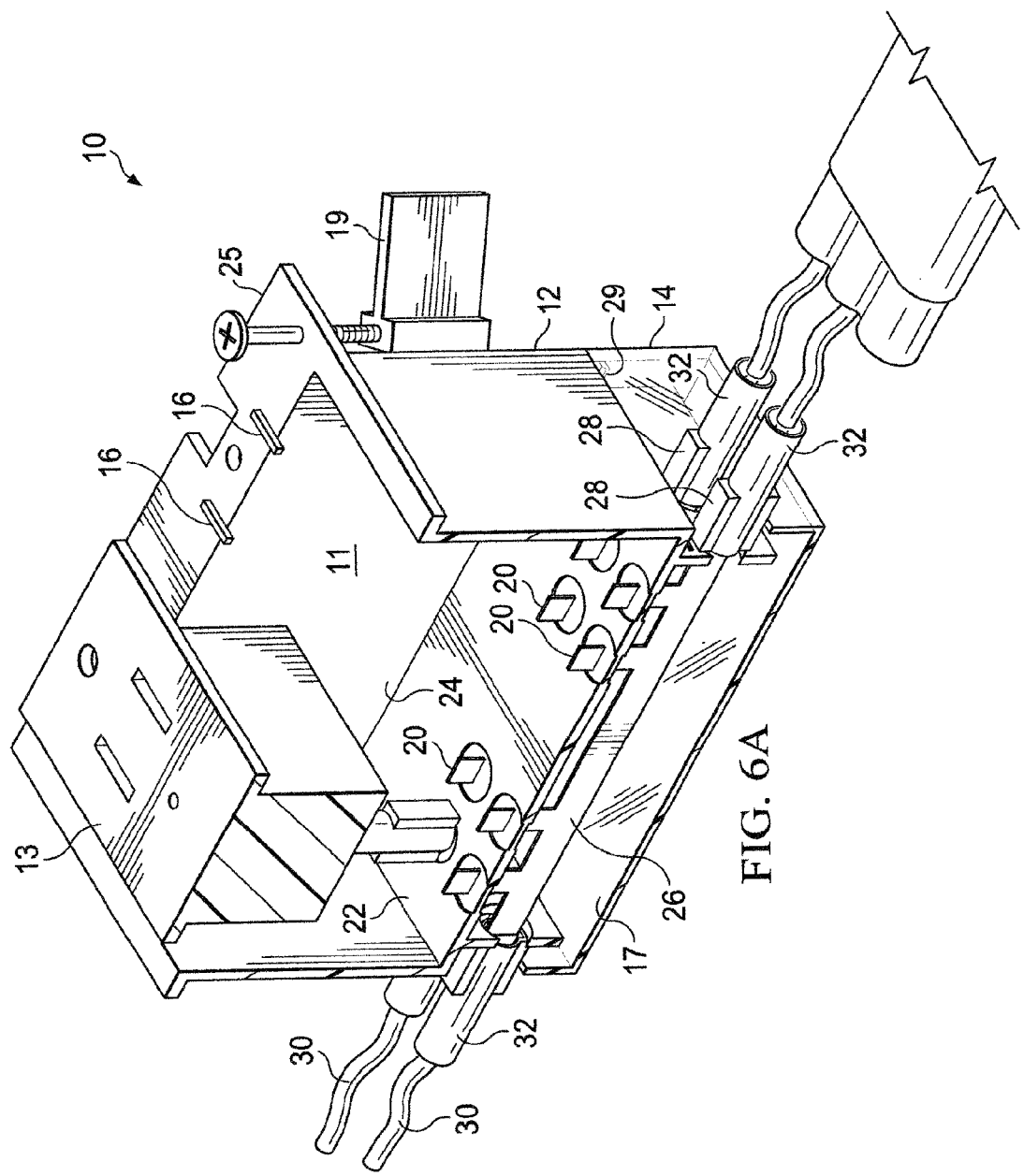
FIG. 6A is a cross sectional view taken along line 6A-6A in FIG. 1, illustrating an embodiment wherein the electrical bus extends in a space or cavity defined between a selectively removable rear cover and the outer surface of the receptacle box bottom.

FIG. 5 illustrates an exploded perspective view of the receptacle box 10. FIG. 6A shows a cross section taken along line 6A-6A in FIG. 1. These figures illustrate one embodiment of the disclosure whereby three (3) parallel electrical busses extend longitudinally behind the bottom wall 22 of body 12. Each of the electrical busses may be comprised of highly conductive material, such as copper, and may be formed by stamping. Each electrical bus has terminals comprising upwarding extending male blade-type connectors 20, and an end terminal 26 formed as a male blade-type connector. The electrical busses and terminals are designed to couple to 10-12 gauge wire segments 30. Each of the terminals 20 and 26 may have an electrical insulation 27 formed thereover, such as a plastic coating. The insulation 27 is stripped away by the female connector 32 during the installation of the respective female connector 32. The insulation 27 prevents unintended contact by a user with an unused hot terminal 20. The protective cover 14 has a pair of opposing ribs 29 on an inner side wall of the cover 14 configured to snap into corresponding slots 31 defined in the outer side wall of the indented portion 15 of body 12, allowing the cover 14 to snap about the lower portion 15 of body 12, as shown, to enclose the electrical busses. This cover 14 provides safety to prevent contact with the powered electrical busses, and arrest any sparks, that meets the Underwriter Laboratories (UL) safety criteria.

As shown in FIG. 5, FIG. 6A, FIG. 7 and FIG. 8, a respective wire segment 30 electrically couples a respective terminal of the receptacle 13 to the respective terminal 20 of the electrical bus. Each wire segment 30 preferably has female type connector 32 on each end, and the terminals of the receptacle 13 are male blade-type terminals similar to the terminals 20 as shown. In an alternative embodiment, the receptacle 13 can have female terminals and the respective end of the wire segment 30 has a male blade-type connector. For instance, for each receptacle 13, a first wire segment provides a hot connection, a second wire segment provides line neutral, and a third wire segment provides ground. The third wire segment is optional in some AC installations. In an alternative embodiment, the first wire segment may provide a first DC voltage, and the second wire segment provides negative. A third connection may not be used in a DC application.

Figure 6B:
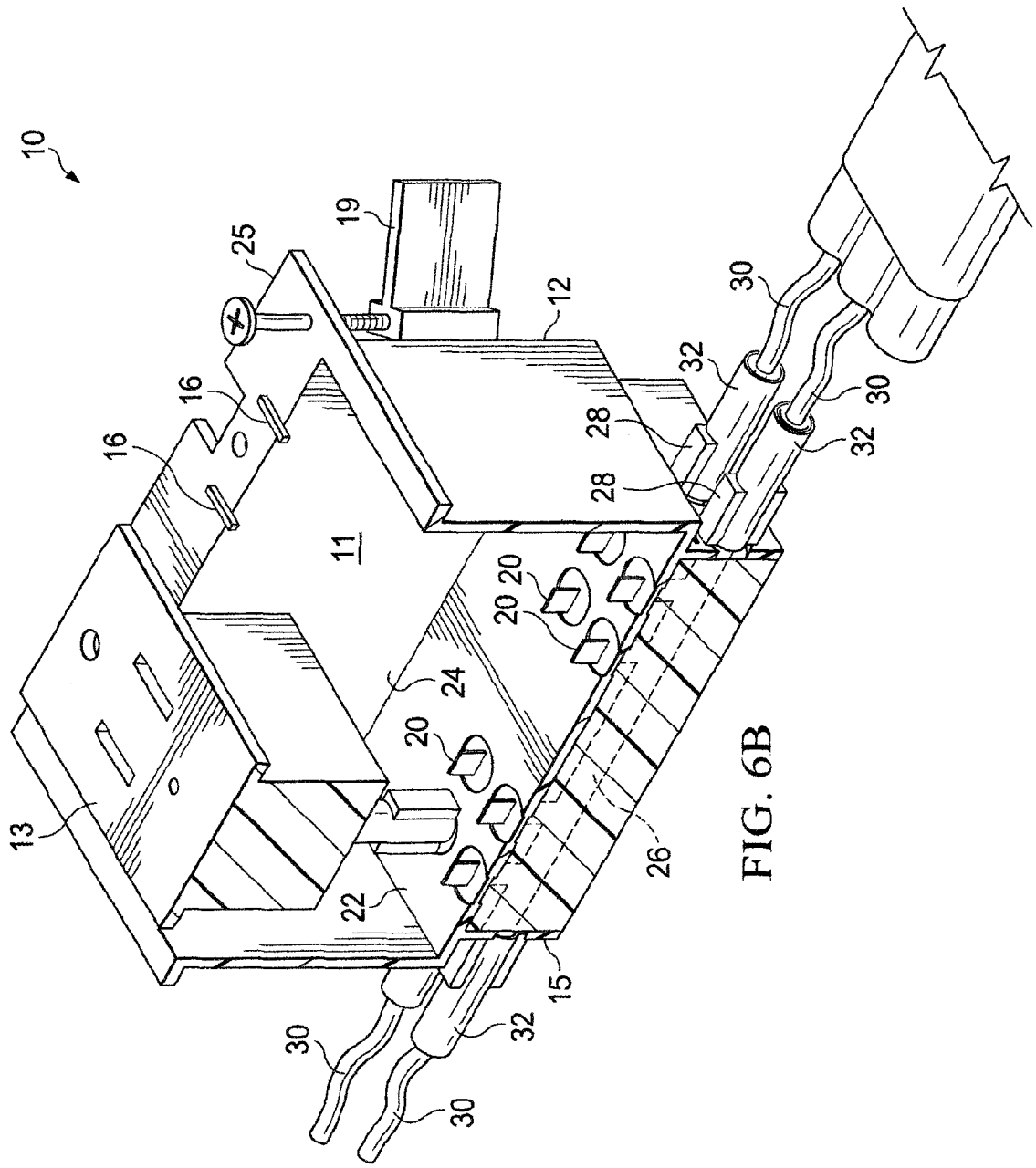
FIG. 6B is a cross sectional view taken along line 6B-6B in FIG. 1, illustrating an embodiment wherein the electrical bus is molded into the bottom of the receptacle box, without the removable rear cover.
Figure 7:
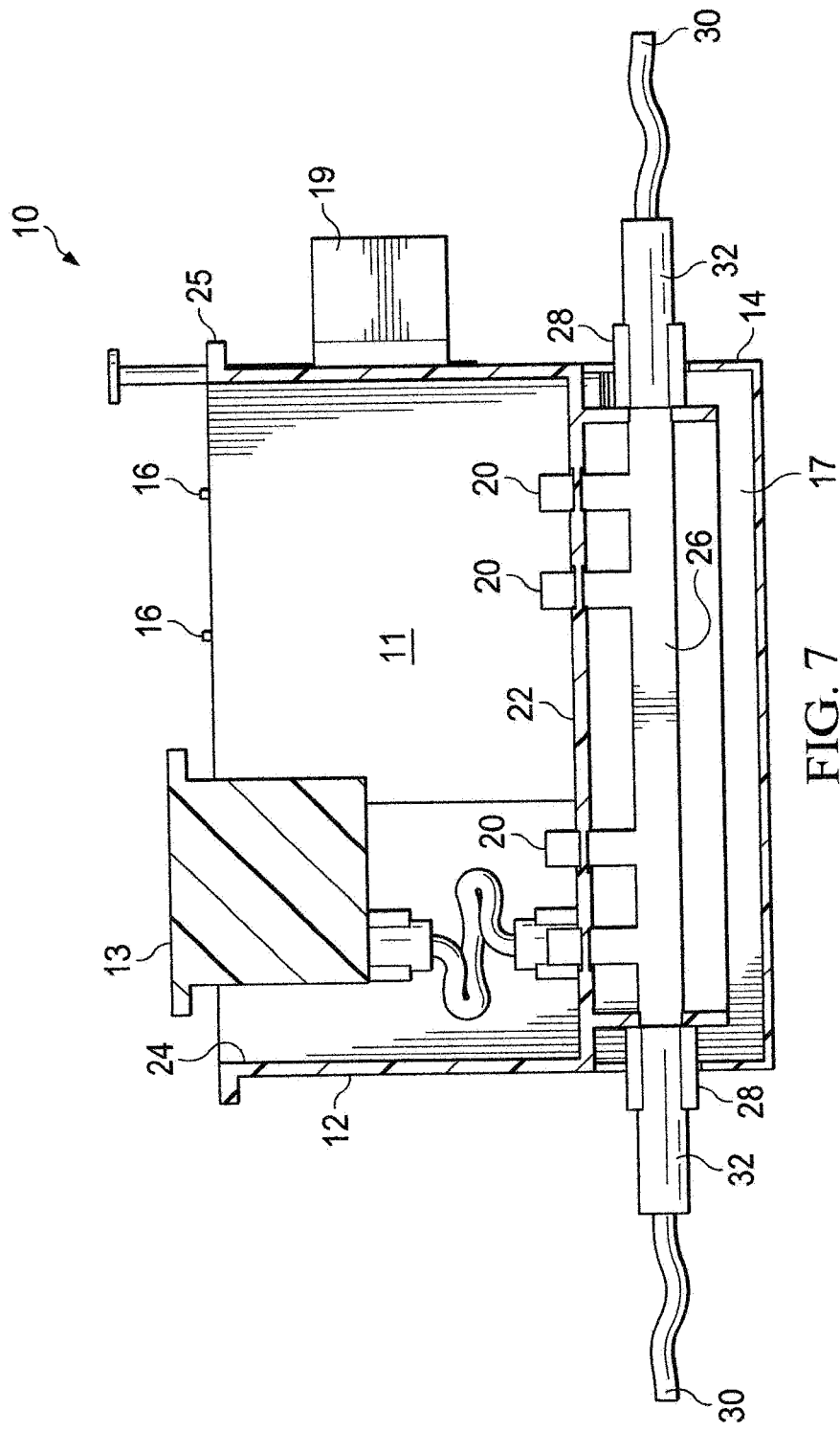
FIG. 7 is a side sectional view of the receptacle box in FIG. 1, illustrating the embodiment of FIG. 6A.
Figure 8:
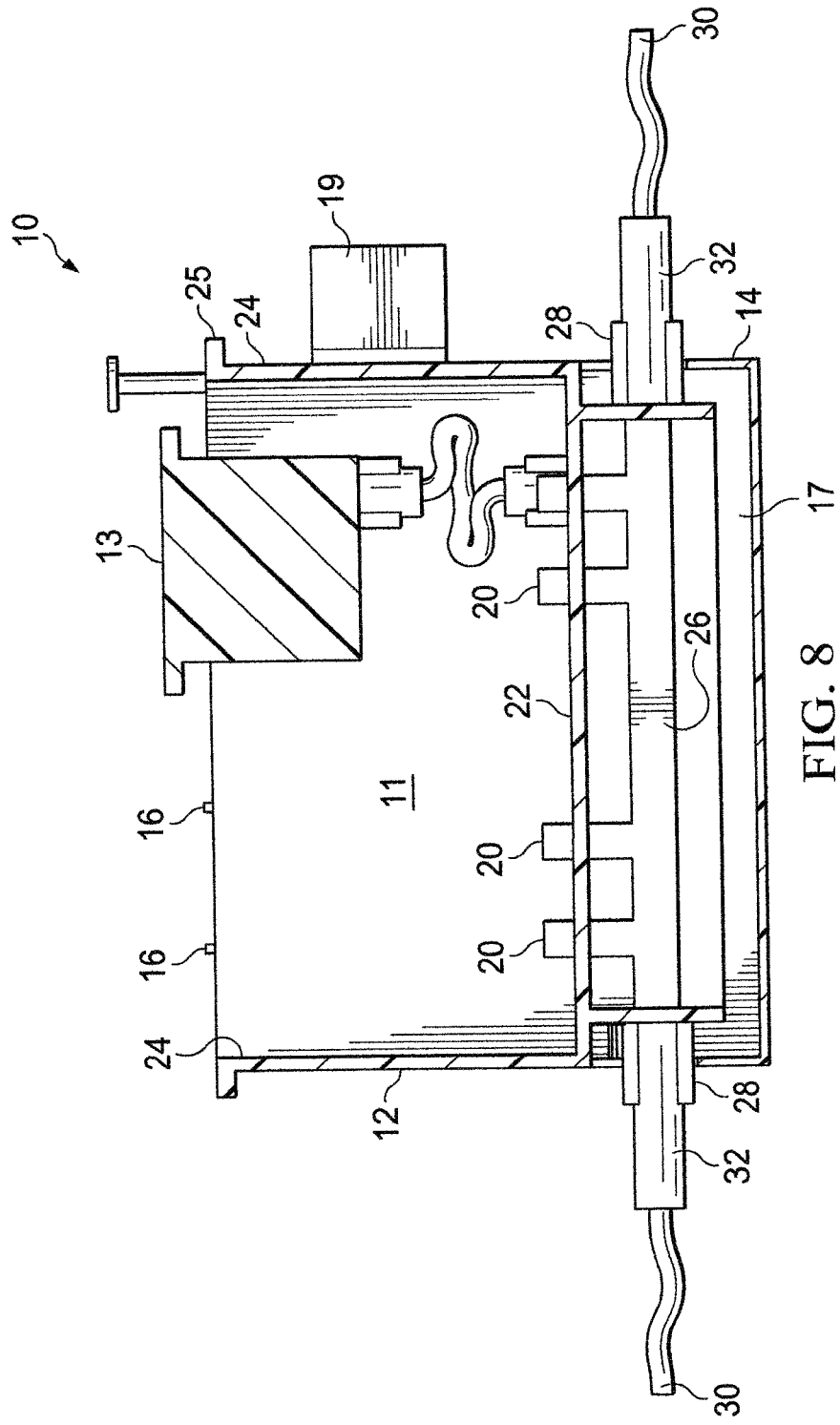
FIG. 8 is a side sectional view of the receptacle box in FIG. 2, illustrating the embodiment of FIG. 6A.

FIG. 6B shows an alternative embodiment of the receptacle box. In this embodiment, the electrical busses are molded into the bottom wall 22, in the indented portion 15 of housing 12, and the removable cover 14 is excluded. An advantage of this embodiment is that the electrical busses are not exposed and eliminating the cover 14 simplifies the design. An advantage of the embodiment of FIG. 6A is that the electrical busses can be accessed by removing the cover 14, to allow voltage testing of the bus such as during fault analysis.

The electrical busses and terminals 26 forming the receptacle box connectors on each side of the receptacle box 10 facilitates the continuity of a circuit connecting other receptacle boxes 10 in series.

Figure 9:
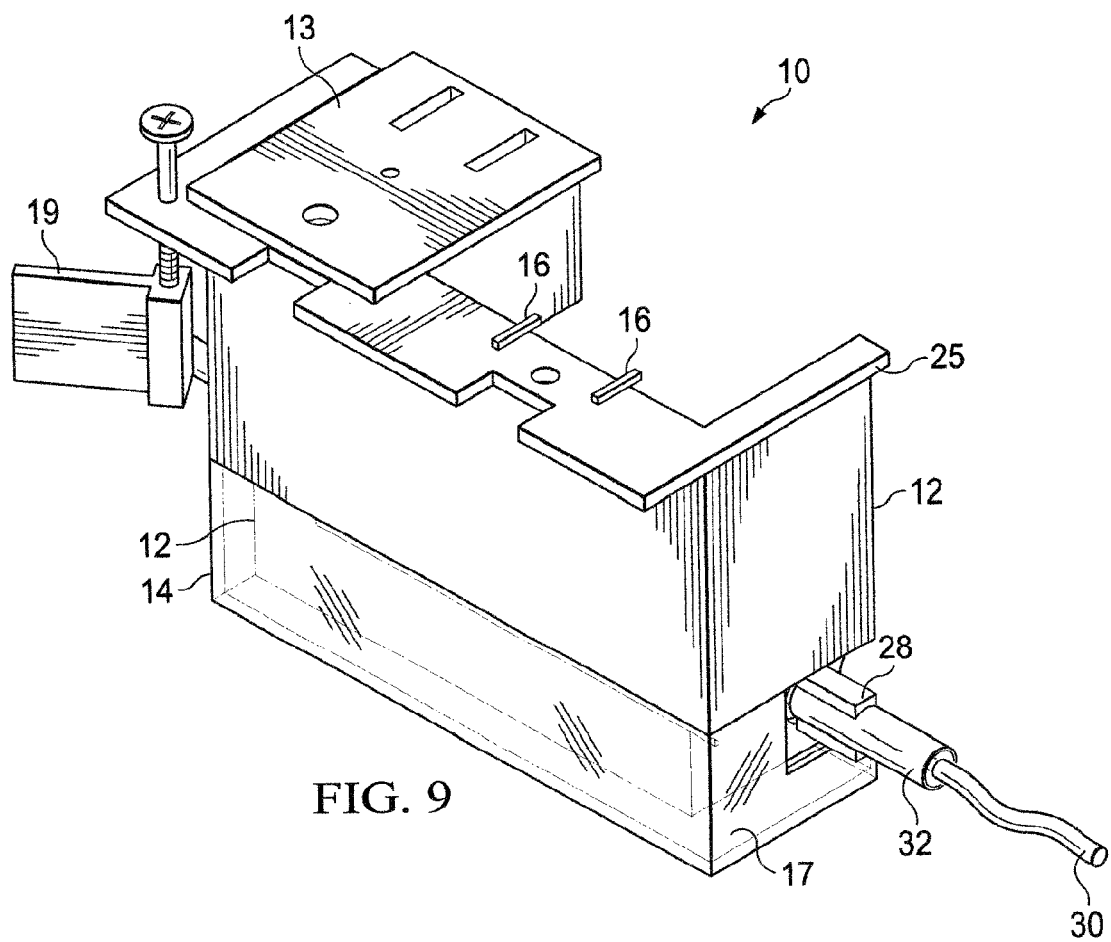
FIG. 9 is a perspective sectional view of the receptacle box in FIG. 1, illustrating the embodiment of FIG. 6A.

Referring to FIG. 9, the cover 14 forms a secondary "pseudobox" box, isolated from and below the cavity 11, which cavity 11 may be referred to as a primary box. The pseudobox is indented from the primary box 11 by approximately ¼ inch to accommodate the removable cover 14. The pseudobox extends beyond the primary box by approximately ¾ inch and is included in the total depth measurement of the device.

Figure 10:
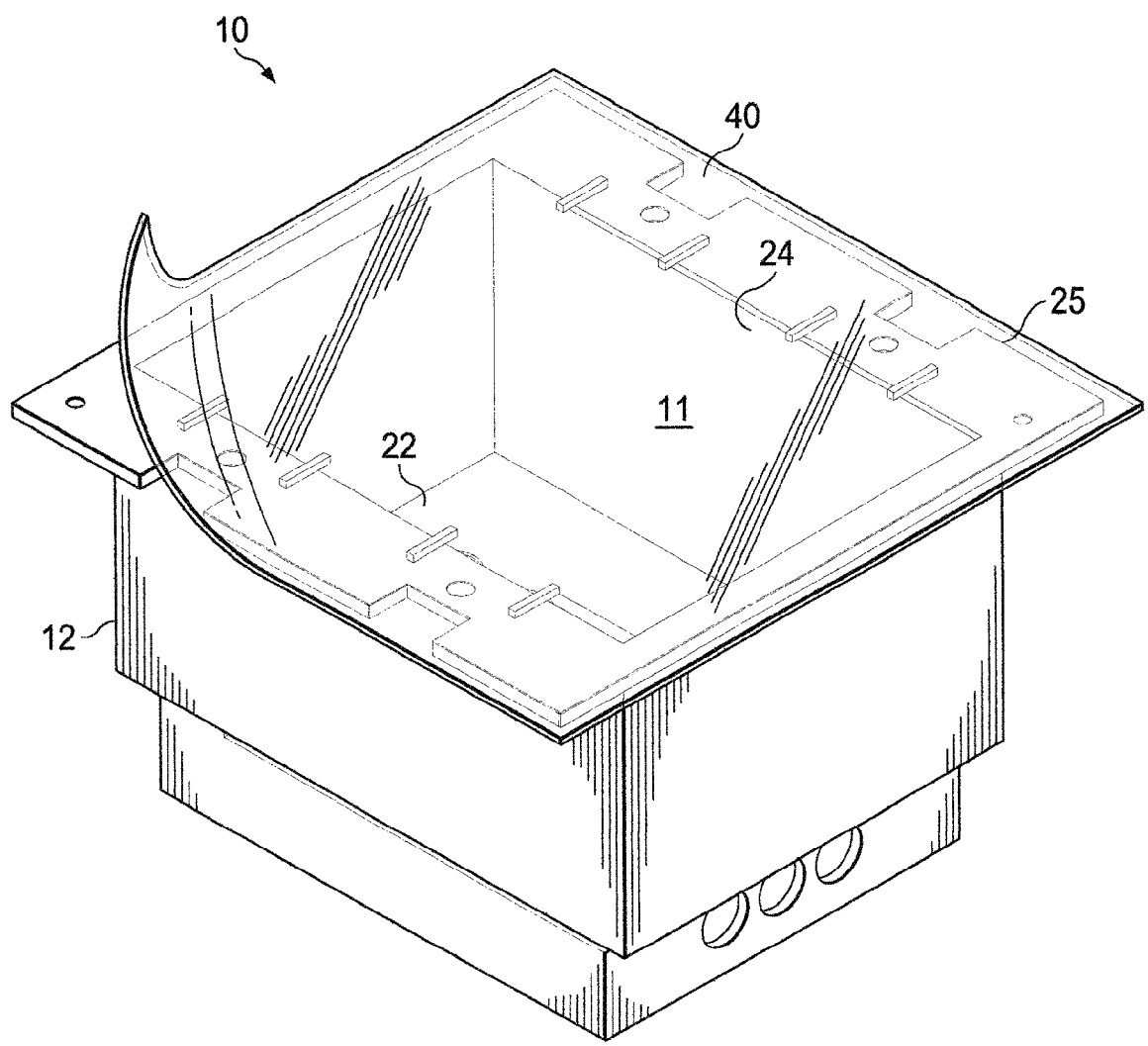
FIG. 10 is a perspective view of the receptacle box without the outlet and wires, seen to include a removable plastic cover formed over the cavity of the receptacle box when manufactured, such that during installation during construction debris, such as sheet rock plaster and particles are prevented from degrading the electrical male terminals and alignment tabs for the receptacles and switches.

FIG. 10 illustrates the receptacle box 10 without the receptacles 13 and wire segments 30, and including a removable peel back protective plastic cover 40. The cover 40 is provided during manufacturing and is left in place during installation. This peel back cover serves to protect the interior of the box during the period between "rough electrical installation" and the "final electrical installation." This protects the terminals 20 and keeps the cavity clean until installation of the receptacles 13. For instance, the cover 40 prevents construction debris, such as sheet rock paste, from entering the cavity 11. The housing 12 may also have additional knock-out tabs to facilitate additional wiring if desired.

The receptacle box 10 simplifies new construction installation and post construction replacement of receptacles and receptacle boxes. The receptacle box 10 is designed to produce less heat/resistance than a conventional receptacle box by reducing the amount of internal wiring contained within the box. Less overall heat equates to a lower fire hazard.

The housing 12 may be constructed via injection molding of clear PVC material. The housing 12 can be constructed in various sizes to accommodate 1, 2, 3, or 4 Decora style switches or outlets, or other styles as desired. As an example, a dual gang receptacle box 10 will measure approximately 4 inches in width, 3¼ inches in depth, and 4½ inches in height, including the top and bottom flanges as shown in FIG. 1. Single gang, triple gang, quadruple gang receptacle boxes 10 can be formed as well.

It will be obvious to those skilled in the art to make various changes, alterations and modifications to the invention described herein. To the extent such changes, alterations and modifications do not depart from the spirit and scope of the appended claims, they are intended to be encompassed therein.

Those skilled in the art will realize that the process sequences described above may be equivalently performed in any order to achieve a desired result. Also, sub-processes may typically be omitted as desired without taking away from the overall functionality of the processes described above.

I claim:

1. A receptacle box comprising:
a housing having a bottom wall and a plurality of sidewalls forming a first recess;
at least one electrical outlet or switch secured to the housing and disposed in the first recess;
a plurality of electrical terminals disposed in the bottom wall;
a plurality of electrical conductor segments extending between the outlet or switch and the electrical terminals; and
a first connector coupled to the housing and electrically connected to the plurality of electrical terminals,
wherein the electrical terminals are comprised of male-type terminals,
further comprising a plurality of openings extending through the bottom wall, wherein the plurality of electrical terminals extend through the openings,
wherein the male-type terminals are coated in an electrical insulation material; and
the segments have at least one female-type connector configured to strip away the electrical insulation material when connected to the respective male-type terminal.

2. The receptacle box as specified in claim 1 further comprising a plurality of electrical busses extending between the first connector and the plurality of electrical terminals.

3. The receptacle box as specified in claim 2 further comprising a cover selectively coupled to the housing and configured to encompass the plurality of electrical busses.

4. The receptacle box as specified in claim 2 wherein the plurality of electrical busses are embedded in the bottom wall of the housing.

5. The receptacle box as specified in claim 1 wherein the segments each comprise a flexible wire having a female-type connector at each end thereof.

6. The receptacle box as specified in claim 1 further comprising:
a second connector selectively coupled to the first connector; and
a plurality of flexible wires coupled to the second connector and configured to couple the receptacle box to another said receptacle box.

7. The receptacle box as specified in claim 2 wherein the housing includes a flange disposed about the first recess, and a member configured to secure a stud between the member and the flange to secure the housing to the stud.

8. The receptacle box as specified in claim 3 wherein the housing has a second recess defined under the bottom wall, wherein the bottom wall separates the first recess from the second recess, and the plurality of electrical busses extend within the second recess.

9. The receptacle box as specified in claim 8 wherein the second recess is formed by walls indented from at least one sidewall of the housing.

10. The receptacle box as specified in claim 9 wherein the cover is flush with the sidewalls when secured to the housing about the walls forming the second recess.

11. The receptacle box as specified in claim 7 wherein the flange has alignment tabs configured to align the electrical outlet or switch when coupled to the housing and disposed in the first recess.

12. A receptacle box comprising:
a housing having a bottom wall and a plurality of sidewalls forming a first recess;
at least one electrical outlet or switch secured to the housing and disposed in the first recess;
a plurality of electrical terminals disposed in the bottom wall;
a plurality of electrical conductor segments extending between the outlet or switch and the electrical terminals; and
a first connector coupled to the housing and electrically connected to the plurality of electrical terminals,
further comprising a plurality of openings extending through the bottom wall, wherein the plurality of electrical terminals extend through the openings,
further comprising a peel-off cover disposed across the first recess and configured to prevent debris from entering the first recess.

13. A receptacle box comprising:
a housing having a bottom wall and a plurality of sidewalls forming a first recess;
at least one electrical outlet or switch secured to the housing and disposed in the first recess;
a plurality of electrical terminals disposed in the bottom wall;
a plurality of electrical conductor segments extending between the outlet or switch and the electrical terminals; and
a first connector coupled to the housing and electrically connected to the plurality of electrical terminals,
wherein the electrical terminals are comprised of male-type terminals,
a first set of said male-type terminals disposed directly under a first said electrical outlet or switch;
a second set of said male-type terminals disposed directly under a second said electrical outlet or switch;
wherein a first set of said segments are coupled between the first set of said male-type terminals and the first said electrical outlet or switch; and
a second set of said segments are coupled between the second set of male-type terminals and the second said electrical outlet or switch.

14. A receptacle box comprising:
a housing having a bottom wall and a plurality of sidewalls forming a first recess;
an electrical outlet or switch secured to the housing and disposed in the first recess;
a plurality of electrical male-type terminals disposed in the bottom wall;
a plurality of electrical conductor segments extending between the outlet or switch and the electrical terminals, wherein the segments have a female-type connector on one end coupled to one of the male-type terminals;
a plurality of electrical busses extending between the first connector and the plurality of electrical terminals;
a first connector coupled to the housing and electrically connected to the plurality of electrical busses;
a cover selectively coupled to the housing and configured to encompass the plurality of electrical busses;
a plurality of openings extending through the bottom wall, wherein the plurality of electrical terminals extend through the openings;
a first set of said male-type terminals disposed directly under the electrical outlet or switch; and a first set of said segments are coupled between the first set of said male-type terminals and the electrical outlet or switch.

\* \* \* \* \*